(No Model.) 3 Sheets—Sheet 1.
J. G. SUTTON.
FILTER.
No. 536,942. Patented Apr. 2, 1895.
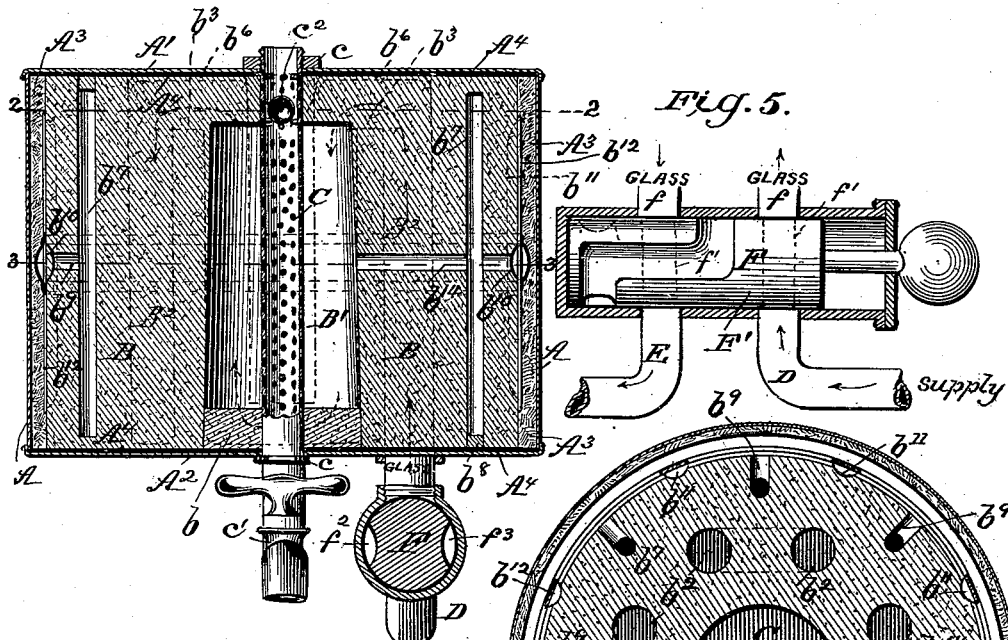
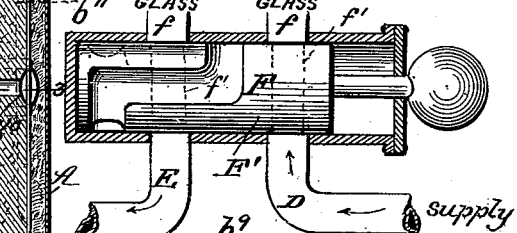
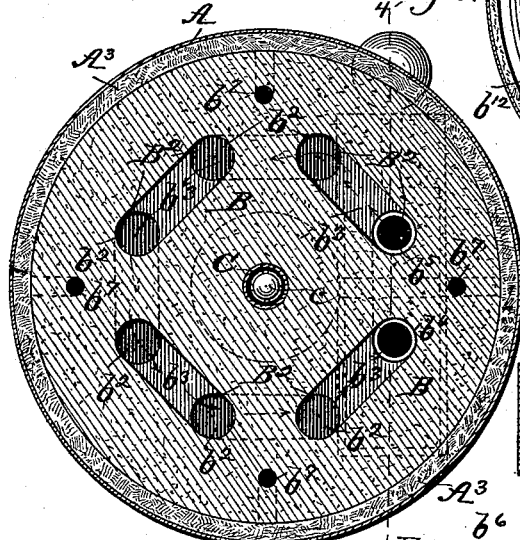
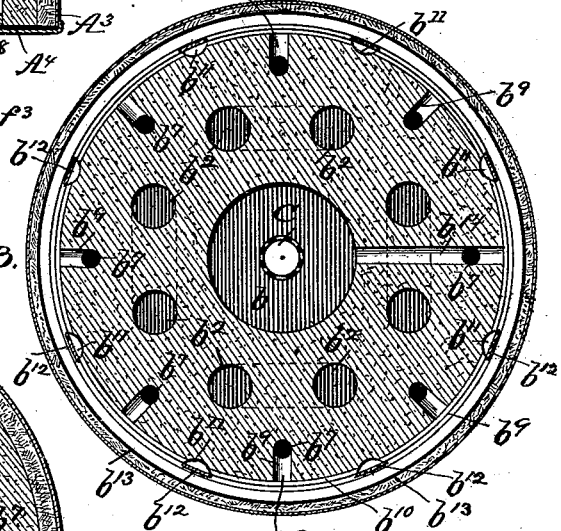
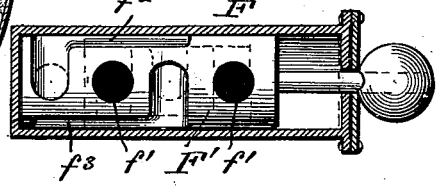
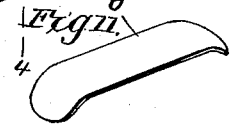
WITNESSES:
Fred G. Dieterich
Jos. A. Ryan
INVENTOR
Joseph G. Sutton
BY Munn & Co.
ATTORNEYS.

(No Model.) 3 Sheets—Sheet 2.

J. G. SUTTON.
FILTER.

No. 536,942. Patented Apr. 2, 1895.

WITNESSES:
Fred G. Dieterich
Jos. A. Ryan

INVENTOR
Joseph G. Sutton
BY Munn & Co
ATTORNEYS.

(No Model.) 3 Sheets—Sheet 3.

J. G. SUTTON.
FILTER.

No. 536,942. Patented Apr. 2, 1895.

WITNESSES:
Fred G. Dieterich
Jno. A. Ryan

INVENTOR
Joseph G. Sutton
BY Munn & Co
ATTORNEYS.

UNITED STATES PATENT OFFICE.

JOSEPH G. SUTTON, OF WEST NEWTON, PENNSYLVANIA.

FILTER.

SPECIFICATION forming part of Letters Patent No. 536,942, dated April 2, 1895.

Application filed May 12, 1894. Serial No. 511,007. (No model.)

*To all whom it may concern:*

Be it known that I, JOSEPH G. SUTTON, a citizen of the United States, residing at West Newton, in the county of Westmoreland and State of Pennsylvania, have invented certain new and useful Improvements in Filters, of which the following specification contains a full, clear, and exact description, reference being had to the accompanying drawings, forming part thereof, in which—

Figure 4:
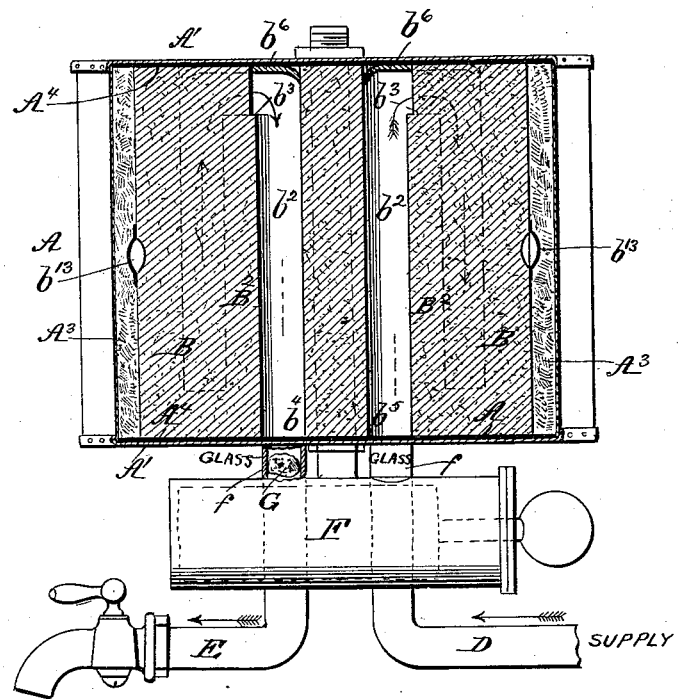
Figure 7:
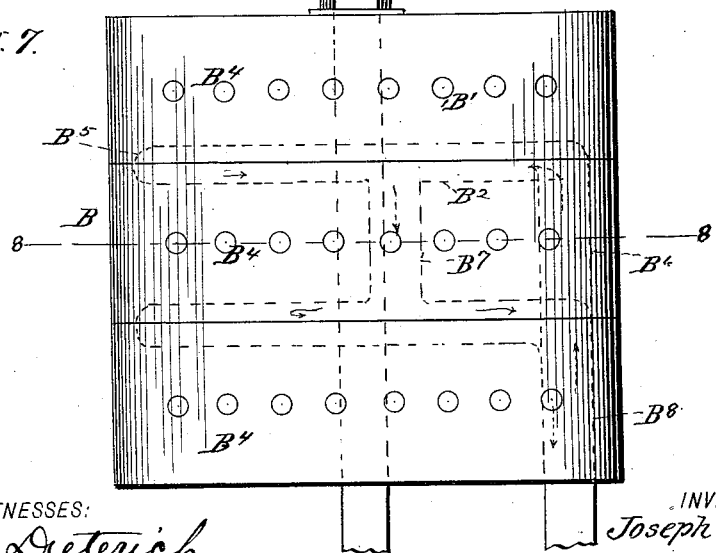
Figure 8:
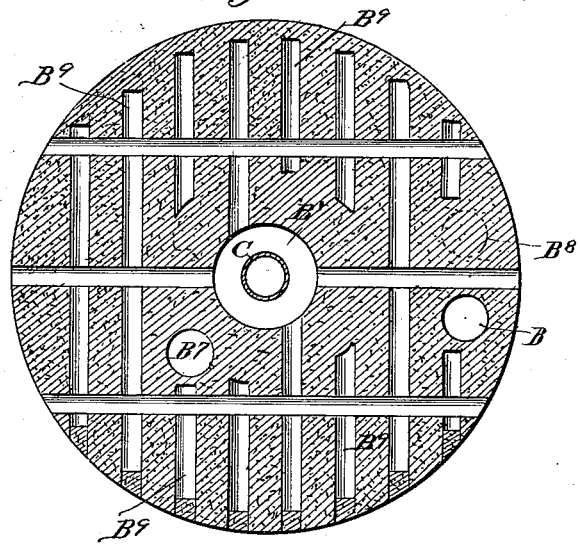
Figure 10:
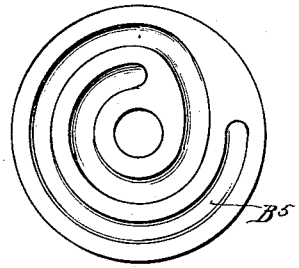
Figure 9:
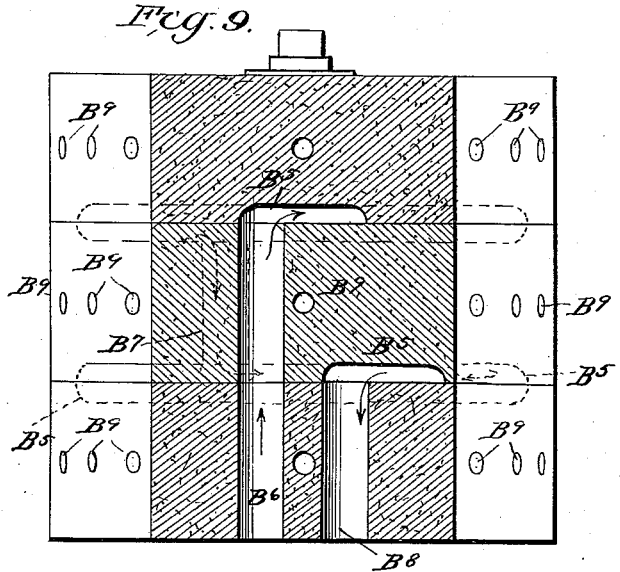
Figure 10A:
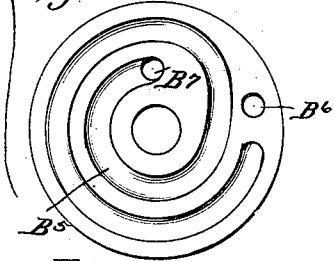
Figure 10B:
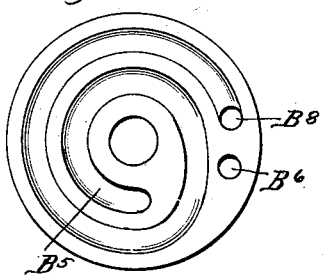

Figure 1 is a central vertical section of my improved filter. Fig. 2 is a horizontal section taken on the line 2—2 Fig. 1. Fig. 3 is a similar section taken on the line 3—3 Fig. 1. Fig. 4 is a vertical section taken on the line 4—4 Fig. 2. Figs. 5 and 6 are detail views of the sliding valve. Fig. 7 is a side elevation of a modified form of filter. Fig. 8 is a horizontal section taken on the line 8—8 Fig. 7. Fig. 9 is a vertical section on the line 9—9 Fig. 8. Figs. 10, $10^a$ and $10^b$ are detail views illustrating the spiral grooves in the different disks. Fig. 11 is a detail perspective view of the plate covering the groove $d^3$ referred to.

The object of the invention is to provide a cheap and durable filter which may be readily cleaned by reversing the flow of water therethrough so as to carry a sponge back and forth through the serpentine supply passage and also cause the water to permeate reversely through the pores of the filtering block and thereby release the foreign matter deposited by the inflow to the filtered water chamber.

The invention relates to that class of filters employing a porous block.

The invention consists in the construction and combinations hereinafter described and claimed.

Referring to Fig. 1, A represents the outer metallic casing which has its ends closed by caps $A'$ $A^2$.

B is the porous filtering block within and of less diameter than the casing, the intervening space being filled with cement $A^3$ while between the top and bottom or ends of the block and the caps are rubber packing gaskets $A^4$.

The center of the block B has a longitudinal bore which forms a reservoir $B'$ for the filtered water and through the end caps and the said reservoir extends the foraminated outlet tube C which is threaded adjacent to both end caps and there provided with nuts $c$ which clamp the end caps to the case. The lower end of the tube C is provided with a faucet $c'$ for drawing off the filtered water and the upper end of tube C is provided with an air valve $c^2$ to permit an out flow when the faucet plug is turned to its open position.

The block B is formed of a single cylindrical piece of porous substance a soft natural stone being preferred. This block is bored longitudinally and centrally to form the reservoir $B'$ the upper end of the bore being reduced to just admit the passage of the tube C and its lower end is closed by an apertured plug $b$ of the same material through which pipe C also passes.

The block B is further provided between its outer face and reservoir C with a vertically and annularly arranged serpentine channel $B^2$ formed by boring through the block from end to end thereof a series of parallel passages $b^2$, and forming transverse grooves $b^3$ in the ends of the blocks so as to connect the ends of the passages $b^2$ alternately; the upper end of one passage $b^2$ being connected with the upper end of the next passage and the lower end of the latter passage being connected with the lower end of the next passage and so on. The lower ends of two of these passages $b^2$ are left disconnected as shown at $b^4$ $b^5$ one to connect with the supply pipe D and the other with an outlet pipe E both connections being effected through a reversing valve F to be presently described. These grooves $b^3$ are closed at their upper sides by covers or closures $b^6$ having curved or rounding ends and cemented in place. These rounded ends form rounding couplings for the passages $b^2$ so that angles are avoided and free passages for the cleaning sponge G are afforded as will be hereinafter described. The water filters through the block from these passages and the inwardly moving water enters the reservoir $B'$ while the water which filters outwardly toward the exterior of the block is gathered into a circular series of smaller outer passages $b^7$ bored in the block from opposite ends but not extending entirely through the block; the open ends of these smaller passages being closed by cement or other plugs $b^8$. The middle of the outer side of the block is provided with a series of short transverse passages $b^9$ which communicate with the passage $b^7$ while the outer ends of the passages $b^9$ are connected by an annular groove $b^{10}$. The outer face of the block is provided with a series of longitudinal grooves $b^{11}$ intermediate of the passages $b^9$ and intersecting the grooves $b^{10}$. The grooves $b^{11}$ are closed by plates $b^{12}$ and a convex band $b^{13}$ closes the annular groove $b^{10}$ and holds the plates $b^{12}$ over the grooves $b^{11}$. The outer circumferential channel thus formed is connected with the reservoir B' by a transverse passage $b^{14}$ extending thereto from the said annular groove. It will be seen that the filtering surface of the block is thus greatly augmented and all of the water sweeping outwardly from the serpentine channel $B^2$ is gathered as well as that which filters directly inward therefrom to the reservoir. The end caps A' being removable permit access to the plates $b^6$ which close the grooves $b^3$ so that they may be removed if necessary.

The reversing valve F has two short glass tubes $f$ which connect with the disconnected ends $b^4 \, b^5$ of the serpentine channel $B^2$ and the supply pipe D and off-take E connect with the valve opposite to these glass tubes. The valve F has a sliding plug F' provided with two transverse ports $f' \, f'$ which register with pipes D, E, and tubes $f f$ when the filter is in use and the surface of the valve is provided with two angular channels $f^2 \, f^3$ adapted to connect the supply pipe D with first one and then the other of the glass pipes $f$ and thus force a current of water alternately through the serpentine passage $B^2$ for cleaning it; the cock $e$ of the off-take pipe E being open during this operation and connected by the other end of the channels $f^2$ or $f^3$ with the other glass tube to allow the water to pass out.

The sponge G before referred to normally lies in the glass pipe $f$ which registers with the off-take E but when the valve F is operated to direct the inflowing water from the supply pipe D through that glass tube the sponge G will be carried along through the serpentine groove $B^2$ and finally into the other glass pipe when the valve will be again adjusted and the sponge will travel in the reverse direction. When the sponge is in the serpentine groove the pressure behind it will of course exceed that in advance of it and this pressure will be transmitted to the water in the reservoir B' and cause it to be forced outwardly into the serpentine groove in front of the sponge and thus release the foreign matter filling the pores of the block in the serpentine groove and thus a double cleansing action is effected.

I will now describe the modified form of filtering block B shown in Fig. 7. This block instead of being in a single cylindrical piece is formed of a series of horizontal sections $B^4$ placed one upon the other and the serpentine channel $B^2$ is formed by means of registering spiral grooves $B^5$ in said faces; the outer end of the top channel thus formed being connected by the vertical passages $B^6$ through the two lower disks with the supply pipe D as in Fig. 1 and the inner end of said spiral passage is connected by a passage $B^7$ through the middle section with the inner end of the spiral channel formed between the two lower sections and the outer end of said lower spiral channel will connect through a vertical passage $B^8$ in the lower section with the off-take E; the connection from said passages $B^6 \, B^8$ with the pipes D, E, being through the medium of the glass tubes $f f$ and the reversing valve F just as in Fig. 1 and which it is not thought necessary to reproduce. The smaller vertical channels $b^7$ of the filter block shown in Fig. 1 find their counterpart in the transverse horizontal passages $B^9$ similarly plugged at their outer open ends and four of the innermost of these passages $B^9$ intersect the filtered water reservoir B' and conduct the filtered water thereto in substantially the same way that it is done in the filter block shown in Fig. 1.

The same central foraminated pipe is used in both constructions and so also with regard to the casing A. I desire it understood however that any form of casing may be used and that the casing may be cast upon the exterior of the block if desired.

The sponge will operate just the same in both forms of the block as a serpentine passage is formed in each and both are connected with the water supply and off-take by the reversing valve.

Having thus described my invention, what I claim as new, and desire to secure by Letters Patent, is—

1. A porous filter block provided with a reservoir or chamber for the filtered water, and a serpentine channel or passage for the unfiltered water and separate and independent of said reservoir; the ends of the channel being disconnected substantially as set forth.

2. A porous filter block provided with a reservoir or chamber for the filtered water, a serpentine channel or passage for the unfiltered water and separate and independent of said reservoir; the ends of the said channel or passage being disconnected, and auxiliary passages in the block separate from said serpentine passage and connected with the said reservoir substantially as set forth.

3. A porous filter block provided with a reservoir for the filtered water, auxiliary passages in the body of the block communicating therewith and a serpentine passage proceeding through the body of the block separate and independent of the said reservoir and its branches and having its ends disconnected from each other and leading out through the same end of the block, substantially as set forth.

4. A porous filter block formed with a central longitudinal reservoir for the filtered water, a serpentine channel for the unfiltered water between the said reservoir and outer side of the block, the said channel being formed by an annular series of parallel longitudinal passages, connected by cross channels at the ends of the block; the adjacent ends of two of said passages being disconnected for the purpose set forth.

5. A porous filter block provided with a central vertical chamber or reservoir for the filtered water, a serpentine passage or channel through the body of the block exterior to said reservoir and independent thereof; the ends of said passage being disconnected, a series of auxiliary passages in the block separate and independent from said serpentine channel, a peripheral groove around the exterior of the block and having transverse passages connecting it with the said auxiliary passages one of said transverse passages leading inwardly to the reservoir, and a band encircling the block and forming the outer wall of said peripheral passage substantially as set forth.

6. A porous filter block provided with a central chamber or reservoir for the filtered water, a serpentine passage for the unfiltered water having disconnected ends, auxiliary passages in the block separate and independent from the said channel, a series of vertical grooves in the outer face of the block, a peripheral groove intersecting the vertical grooves, transverse passages connecting said groove with the auxiliary passages; one of said transverse passages leading inwardly to the reservoir-plates covering said vertical grooves, and a band covering the peripheral groove and binding said plates in position over the grooves covered thereby substantially as set forth.

7. A porous filter block having a central longitudinal bore forming the reservoir for the filtered water, and a separate and independent serpentine channel through the body of the block exterior to the reservoir and formed of an annular series of parallel longitudinal passages bored through the block from end to end, grooves in the ends of the block connecting said passages and covers for the grooves; the ends of two of the said passages being disconnected substantially as set forth.

8. A filter comprising a casing having an inlet and an outlet passage a porous block in the casing and having a filtered water reservoir, and a serpentine or zig-zag passage through the body of the block exterior to and independent of said reservoir and connected at its ends with said inlet and outlet passages a reversing valve connected with said two passages to direct the flow through either passage and out of the other passage and means for withdrawing the filtered water substantially as set forth.

9. A filter comprising a casing having removable ends a porous block in the casing, a filling or packing between the two; the said block having a central longitudinal reservoir for the filtered water, a serpentine channel concentric with the reservoir and disconnected therefrom, the bends of the serpentine groove being at the ends of the block and provided with covers accessible when said casing-caps are removed inlet and off-take pipes communicating with the ends of the serpentine channel and means for withdrawing the filtered water, substantially as set forth.

10. The herein described filter comprising the casing, having end caps, the longitudinally bored porous block; said bore forming the reservoir for the filtered water, a channel being formed through the block exterior to the said reservoir, inlet and off-take pipes communicating with the ends of the said channel, and a foraminated tube extending through the said end caps and reservoir and provided at the outer sides of the caps with nuts, and a faucet at the lower end of said tube substantially as set forth.

11. The combination with the casing and the porous block having a reservoir for the filtered water and a channel therearound for the unfiltered water, an off-take and a supply pipe connected with the ends of the said channel, a traveling cleaner to traverse said channel, and means for reversing the direction of the flow through said channel substantially as set forth.

12. The combination with the casing having the glass tubes in one end and a porous filter block in the casing and provided with reservoir for the filtered water and a separate channel therearound for the unfiltered water and registering at its ends with the said glass tubes, of a traveling cleaner to traverse the said channels and tubes, and a reversing valve connected with said tubes and having an off-take and a supply pipe for the unfiltered water substantially as set forth.

JOSEPH G. SUTTON.

Witnesses:
SOLON C. KEMON,
CHAS. A. PETTIT.